No. 870,898. PATENTED NOV. 12, 1907.
J. R. McDANILL.
HORSE DETACHER.
APPLICATION FILED MAY 13, 1907.
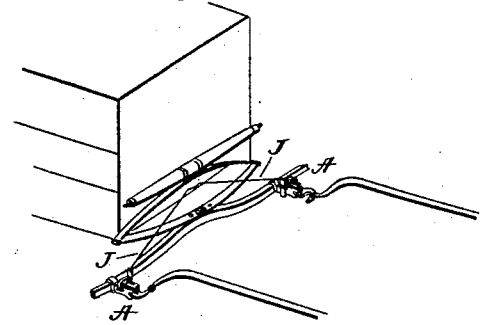
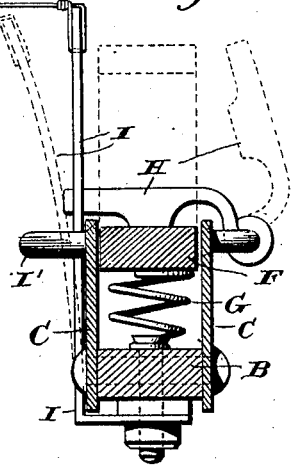
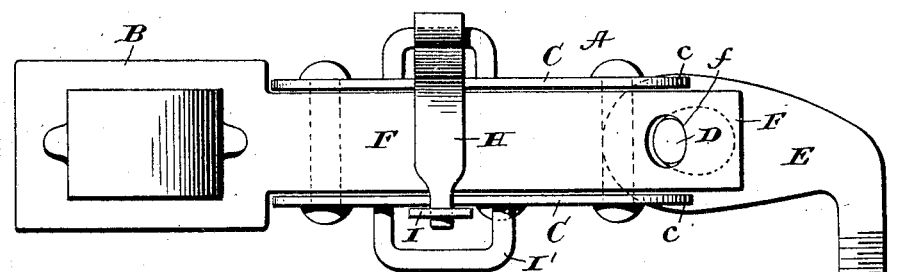
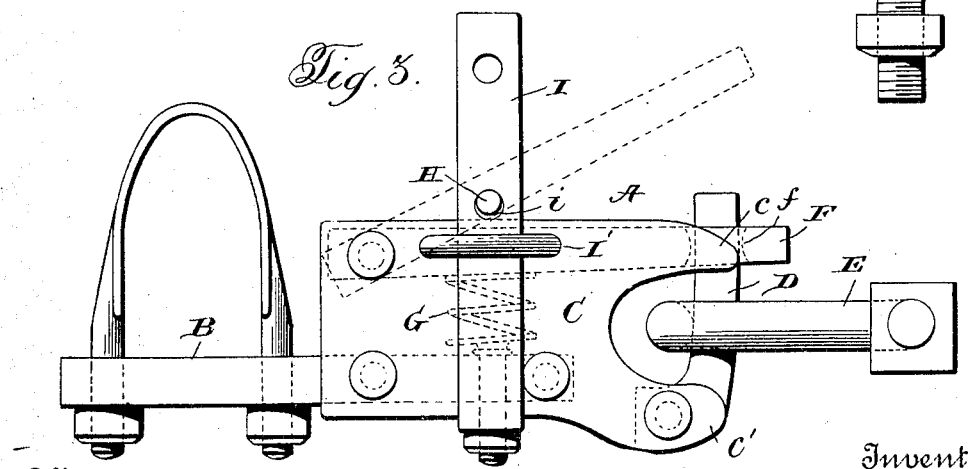
Witnesses:
Jas E. Hutchinson
Thos. R. Heath
Inventor:
John R. McDanill,
By John M. Spellman Attorney

UNITED STATES PATENT OFFICE.

JOHN RILEY McDANILL, OF AUBREY, TEXAS.

HORSE-DETACHER.

No. 870,898. Specification of Letters Patent. Patented Nov. 12, 1907.

Application filed May 13, 1907. Serial No. 373,495.

*To all whom it may concern:*

Be it known that I, JOHN RILEY MCDANILL, a citizen of the United States, residing at Aubrey, in the county of Denton and State of Texas, have invented certain new and useful Improvements in Horse-Detachers, of which the following is a specification.

This invention relates to improvements in horse detachers, and the object of the invention is the provision of a simple and efficient device of this character, which may be quickly and easily manipulated by the driver to permit the release of the thills in the event of a runaway or other accident.

Other objects of the invention will be apparent from the detailed description hereinafter when read in connection with the accompanying drawings, forming a part thereof, wherein a preferable embodiment of my invention is shown and wherein like numerals of reference refer to similar parts in the several views.

In the drawings: Figure 1 is a fragmentary perspective view of the forward part of a vehicle equipped with my improved horse detacher. Fig. 2 is a top plan view of one of the thill couplings, the thill being shown secured therein. Fig. 3 is a side elevation of one of the thill couplings in its closed position, and Fig. 4 is a cross section on the line 3—3 of Fig. 3.

Referring now more specifically to the drawings, the invention consists in two thill couplings A A, which are designed to be secured to the forward axle of the vehicle and which are so constructed that they may be readily actuated by the driver of the vehicle to release the thills held therein. The thill couplings A A each comprise a base plate B which is designed to be clamped to the under side of the axle of the vehicle by a suitable band passing thereover and which extends forwardly from said axle. Secured to the base plate B, at each side thereof are side plates C C, the forward ends of which project beyond the forward end of said base plate and are provided with upper and lower ears c, c'. Pivotally mounted between the lower ears c' of the side plates C C is a pin D, which is designed to engage an eye bolt E carried by the rear end of the thills. The pin D is normally held in a vertical position with the upper end thereof between the upper ears c of the side plates C C by a top plate F, which is pivotally mounted at its rear end between the side plates C C and is provided at its forward end with an aperture f designed, when said plate is in its normal position, to engage the upper end of the pin D. Interposed between the top plate F and base plate D is a coiled spring G, the normal tendency of which is to elevate the top plate F and thereby release the pin D. The plate F is held in engagement with the upper end of the pin D by means of a catch H, which is pivotally mounted in any suitable manner to the outer one of the side plates C C, and which is arranged in its locked position to overlie said top plate.

The catch H is maintained in this position by means of a spring plate I, which is rigidly secured at its lower end in any suitable manner to the inner one of the side plates C C and which is provided with a suitable aperture i therein which is designed to be engaged by the free end of the catch H. The spring plate I is encircled by a loop I' which serves to limit the movement thereof, said loop, however, permitting the spring plate to be moved a sufficient distance to effect the release of the catch.

Secured to the upper ends of the spring plates I of the thill couplings A A are wires or rods J, which extend inwardly and terminate in any suitable form of actuating mechanism, whereby said plates may be simultaneously moved inwardly by the driver of the vehicle to effect the release of the catches H.

From the above description, it will be apparent that when the spring plates I I of the thill couplings A A are moved out of engagement with the ends of the catches H H, the springs G G will immediately move the top plates F F out of engagement with the upper ends of the pins D D and thereby effect the release of the thill.

I do not desire to limit myself to the precise form and construction shown in the drawings, as it is obvious that many minor changes may be made thereto without departing from the spirit of the invention as defined in the appended claims.

Having thus described the invention, what is claimed is:—

1. A thill coupling comprising a frame, a pin pivotally mounted therein, a spring actuated plate movably mounted in the frame and provided with a portion adapted to engage the upper end of said pin to normally hold the same in a substantially upright position, a catch for holding said plate in engagement with said pin, and means for releasing said catch.

2. A thill coupling comprising a base plate and separated side plates, a pin pivotally mounted between the forward ends of said side plates, a top plate pivotally mounted between said side plates and provided with a portion adapted to engage the free end of said pin, a spring interposed between said top and base plates, and means for holding said top plate in engagement with said pin.

3. A thill coupling comprising a base plate, and separated side plates, a pin pivotally mounted between the forward ends of said side plates, a top plate pivotally mounted between said side plates and provided with a portion adapted to engage the free end of said pin, a spring interposed between said top and base plates, a catch adapted to overlie said top plate and hold the same in engagement with said pin, and means for releasing said catch.

4. A thill coupling comprising a base and separated side plates, a pin pivotally mounted between the forward ends of said plates, a spring actuated plate pivotally mounted between the side plates and provided with a portion therein adapted to engage the free end of said pin, a catch pivotally secured to one of said side plates and arranged to overlie said spring actuated plate, and a spring member secured to the other of said side plates and provided with an aperture adapted to engage the free end of said catch.

5. A thill coupling comprising a base plate and separated side plates, a pin pivotally mounted between the forward ends of said side plates, a top plate pivotally mounted between said side plates and provided with a portion adapted to engage the free end of said pin, a spring interposed between said top plate and base plates, a catch pivotally secured to one of said side plates and adapted to overlie said top plate and hold the same in engagement with said pin, and a spring plate secured to the other of said side plates and provided with a portion adapted to be engaged by the free end of said catch.

In testimony whereof I have signed my name to this specification in the presence of two subscribing witnesses.

JOHN RILEY McDANILL.

Witnesses:
E. V. HARDWAY,
WM. A. CATHEY.